United States Patent [19]

Breitschwerdt et al.

[11] 3,994,525
[45] Nov. 30, 1976

[54] ROOF FOR MOTOR VEHICLES

[75] Inventors: Werner Breitschwerdt, Stuttgart; Rüdiger Hoffmann, Sindelfingen; Werner Heiss, Grafenau-Doffingen; Gunter Siegel, Sindelfingen; Hans P. Spreng, Sindelfingen; Johann Tomforde, Sindelfingen, all of Germany; Axel Stehle, Nanuet, N.Y.

[73] Assignee: Daimler-Benz Aktiengesellschaft, Germany

[22] Filed: Jan. 15, 1975

[21] Appl. No.: 541,117

[30] Foreign Application Priority Data
Jan. 26, 1974   Germany............................ 2403739

[52] U.S. Cl. .............................. 296/137 B; 52/172; 98/2.14; 160/224
[51] Int. Cl.² ......................................... B60J 7/02
[58] Field of Search .......... 296/137 B, 137 R, 31 R; 98/2.14, 31; 49/125, 372; 52/619, 615, 303, 172; 160/223, 224; 55/388, 389

[56]            References Cited
            UNITED STATES PATENTS

| | | | |
|---|---|---|---|
| 1,483,290 | 2/1924 | Eggimann | 296/137 R |
| 1,862,058 | 6/1932 | Lintern | 296/137 R |
| 2,772,917 | 12/1956 | Goldman | 296/137 R |
| 2,864,132 | 12/1958 | Clements | 52/615 X |
| 2,885,746 | 5/1959 | Gura | 52/172 |
| 3,568,364 | 3/1971 | Schmid | 49/139 |
| 3,578,061 | 5/1971 | Weidenau | 160/223 |
| 3,713,689 | 1/1973 | Podolan | 296/137 B |
| 3,805,405 | 4/1974 | Ambos | 98/31 |

FOREIGN PATENTS OR APPLICATIONS

| | | | |
|---|---|---|---|
| 2,127,138 | 12/1971 | Germany | 5/388 |
| 1,168,807 | 10/1969 | United Kingdom | 160/223 |

Primary Examiner—Robert G. Sheridan
Assistant Examiner—Donald W. Underwood
Attorney, Agent, or Firm—Craig & Antonelli

[57]            ABSTRACT

A roof for a motor vehicle, particularly a passenger motor vehicle which possesses an area to be opened intermediate the windshield and a roll-over girder disposed within the area of the rear window; the area to be opened in the roof is subdivided into two sections which are adapted to be displaced telescopically and can be retracted one within the other into the area of the roll-over girder so as to be completely covered by the outer member of the roll-over girder; the roll-over girder together with the outer covering member thereby preferably forms a hollow body.

46 Claims, 8 Drawing Figures

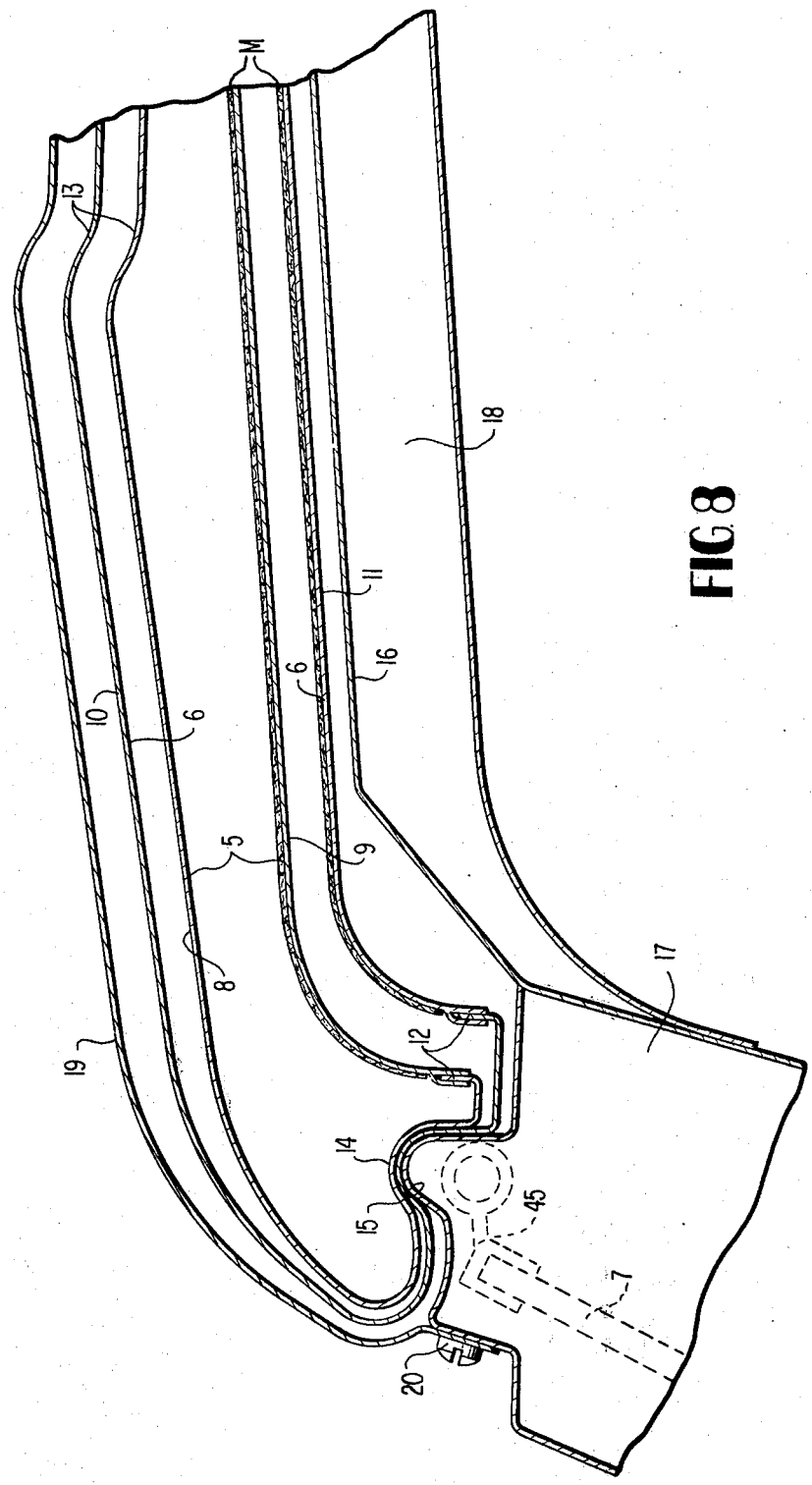

ROOF FOR MOTOR VEHICLES

The present invention relates to a roof for a motor vehicle, especially for a passenger motor vehicle, with an area to be opened between a front windshield and a roll-over girder disposed within the area of the rear window.

It is known to provide a removable roof member which commences at the windshield frame and covers a roll-over girder so that the vehicle equipped with this roof can be used as roadster or as coupe, with the advantages inherent in these types of vehicles. The non-removable roll-over girder offers also with the use as roadster a protection in case the vehicle turns over or rolls over. To construct the area to be opened as a removable structural part, however, is none too favorable for several reasons. On the one hand, this removable structural part represents quite a bulky object which has to be taken along at all times. It occupies a considerable amount of space in particular with a sports type vehicle or with a two-seater sports type vehicle, which space is then lost for the accommodation of luggage. On the other hand, it is unfavorable that the vehicle has to be stopped in order that the roof part can be taken out of the luggage space, be mounted and subsequently fastened.

The present invention is concerned with the task to so construct a roof of the aforementioned type that a larger openable area is created without having to disassemble roof parts so that also an opening and especially also a closing is quite possible without difficulty during the drive. The present invention essentially consists in that the area to be opened is subdivided into at least two sections which are telescopically slidable one within the other and retractable rearwardly into the area of the roll-over girder. This construction offers the advantage that the opening and closing of the roof can be carried out by a person disposed in the vehicle whereas additionally the roof sections which are displaceable for purposes of opening, do not occupy any space that is required or needed for luggage pieces or the like.

The vehicle receives an advantageous optical impression if the sections are slidable externally over the roll-over girder into a hollow space formed by the latter and a cover sheet metal member. This has the advantage that the sections, in the opened condition, are completely covered by the covering sheet metal member and therefore are arranged non-visibly.

In one embodiment of the present invention, provision is made that each section consists of two shells connected with each other at the lateral edges thereof, of which respectively only one shell member is constructed as bearer and guide element. This offers the advantage that only one of the shells must fulfill a technical function whereas the other can be selected as decorative part. It is thereby favorable if the upper outer shell of each section is provided within the area of the lateral edges with groove-shaped profilings extending in the vehicle longitudinal direction which serve as slide guide means.

Accordingly, it is an object of the present invention to provide a roof for a motor vehicle, especially a passenger motor vehicle, which avoids by simple means the aforementioned shortcomings and drawbacks encountered in the prior art.

Another object of the present invention resides in a roof for a motor vehicle in which the area to be opened no longer has to be constructed as a strutural part which must be completely removed.

Still another object of the present invention resides in a roof for a passenger motor vehicle of the type described above in which the roof can be opened and closed by the passenger while on the inside of the vehicle.

A further object of the present invention resides in a roof for a motor vehicle which is adapted to be opened, and in which no bulky roof parts have to be disassembled, removed and stored in the luggage compartment when the roof is to be opened.

Still a further object of the present invention resides in a roof for a passenger motor vehicle in which the roof can be readily opened, yet the luggage compartment does not have to serve as storage space for roof parts removed when the vehicle roof is opened.

Another object of the present invention resides in a roof for a passenger motor vehicle of the type described above in which the area of the roof which can be opened is to be increased without requiring the actual disassembly of any roof parts during opening and closing.

A further object of the present invention resides in an openable roof for motor vehicles which is structurally simple, yet can be designed to enhance the aesthetic appearance of the vehicle.

These and further objects, features and advantages of the present invention will be more apparent from the following description when taken in connection with the accompanying drawing which shows, for purposes of illustration only, one embodiment in accordance with the present invention, and wherein:

FIG. 8 is a transverse cross-sectional view through a part of the open roof, taken along line VIII—VIII of FIG. 1.

Figure 1:
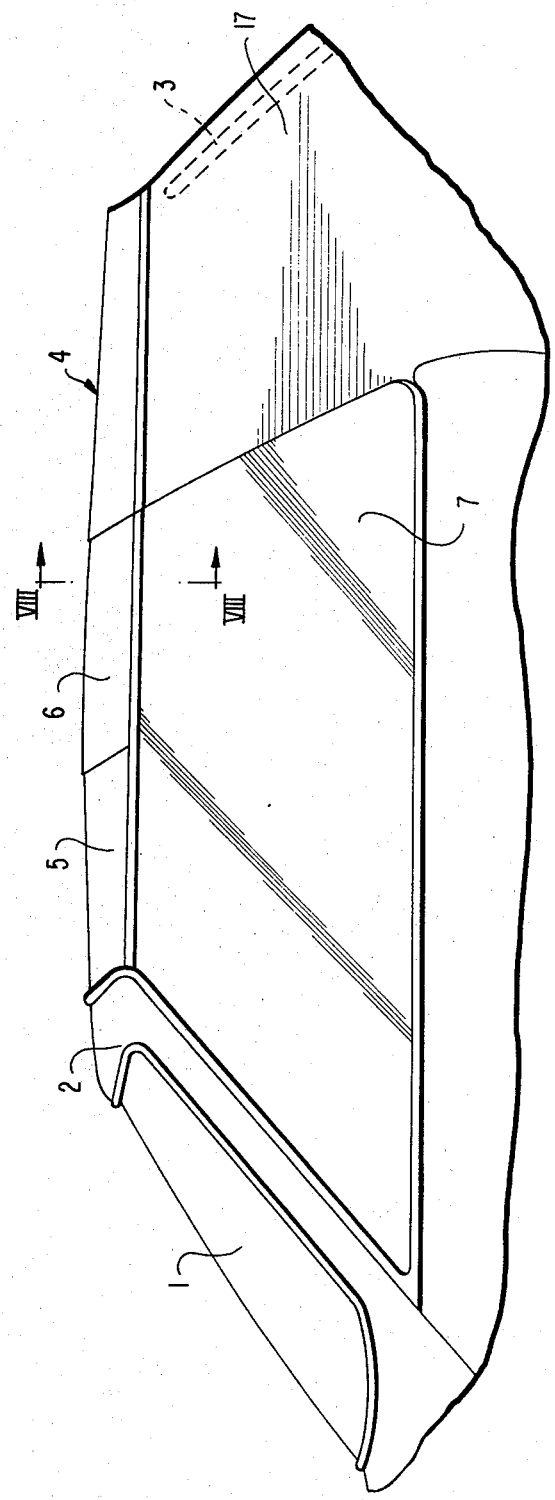
FIG. 1 is a somewhat schematic partial side elevational view of a vehicle body with a roof according to the present invention.

Referring now to the drawing wherein like reference numerals are used throughout the various views to designate like parts, and more particularly to FIG. 1, a side view of the body of a preferably two-seater sports coupe is illustrated in this figure which includes a removable, openable area within the roof area between a frame 2 enclosing the windshield 1 and a roll-over girder generally designated by reference numeral 4 receiving the rear window 3. The removable area consists of two sections 5 and 6 telescopically slidable one within the other which, together are adapted to be telescoped or retracted back into the area of the roll-over girder 4 whose length in the vehicle longitudinal direction corresponds at least to the length of the telescoped together sections 5 and 6. The sections 5 and 6 extend in the vehicle longitudinal direction of a self-supporting, cantilever-like manner between the roll-over girder 4 and the roof frame 2. In the vehicle transverse direction, they occupy the entire area of the roof width so that they adjoin side windowpanes 7 which are arranged preferably lowerable into a door. The sliding displacement of the sections 5 and 6 can take place manually or with the aid of servo-mechanisms of any conventional type, forming no part of the present invention and therefore not illustrated in detail herein. Furthermore, a closure and locking mechanism of conventional type (not shown), which again forms no part of the present invention and therefore is not illustrated in detail herein, is provided between the windshield frame 2 and the section 5 which is also actuatable from the inside either manually or by means of a conventional servo-mechanism. The locking mechanism is appropriately so constructed that it is able to overcome a prestress and is still operable even in case of height deviations.

As can be seen in particular from FIG. 8, the sections 5 and 6 consist each of two shells 8 and 9 respectively 10 and 11 which are connected with each other along their longitudinal edges by a plug connection 12 and preferably by an additional bonding or gluing with the use of conventional adhesives, suitable for this purpose. The shells 8 and 9 respectively 10 and 11 each form tubular-shaped hollow bodies which are slidable one within the other telescopically. The outer shells 8 and 10 are preferably made of a non-corrosive high-grade steel of conventional type which includes an outer surface treated by brushing. These high-grade steel shells 8 and 10 offer the advantage that they match practically with any color of the remaining vehicle whereas they are additionally very insensitive and above all do not show any slide tracks of parts sliding along the same, even during frequent sliding movements, since in this case the brushing direction and pattern becomes effective in an advantageous manner. The inner shells 9 and 11 are preferably made of synthetic plastic material, such as synthetic resinous material of conventional type. They do not possess any support function but represent essentially only decorative elements which form the ceiling of the vehicle. Both for aesthetic as also rigidity reasons, the roof receives a curved external contour of convex configuration and a curve ceiling, whence the shells 8 to 11 are curved convexly. This rigidity of the outer shells 8 and 10 can thereby be further increased by additional profiles 13 (FIG. 8) extending in the vehicle longitudinal direction.

As already mentioned, the outer shells 8 and 10 assume exclusively the function of support and guide elements. Their outer edges are bent back inwardly on both sides toward the vehicle center and are provided with a groove-shaped profiling 14 open in the downward direction. Within the area of these profiles 14 they abut one upon the other whereby by reason of the profiling they align themselves with respect to each other in a predetermined position. The groove-shaped profilings 14 are located within an area which is normally not visible and therefore cannot disturb the optical impression, also if, for example, a soiled lubricant is present within this area. In order to favor the sliding movement between the two shells 8 and 10 and within the area of the groove-shaped profilings 14, it is appropriate, if this area is coated with a slide layer of synthetic resinous material or the like of conventional type as normally used for those purposes.

The roll-over girder 4 is provided with a slide track 15 corresponding to the profilings 14. It includes an upper sheet metal member 16 which is provided within the lateral area with a convex raised slide track 15 extending in the longitudinal direction which corresponds in its dimensions to the groove-shaped profilings 14 of the upper shell 10 of the larger displaceable roof part 6. The roll-over girder 4 is fashioned of an upper sheet metal member 16 secured at lateral columns 17 which are kept relatively wide in the vehicle longitudinal direction. The upper sheet metal member 16 is further reinforced within its forward area by a hat-shaped profile 18 projecting into the vehicle interior space, as can be seen from FIG. 4.

A covering sheet metal member 19 (FIG. 8) is secured at the lateral columns 17 by means of screws 20, which in its contour corresponds with a slight oversize to the contours of the upper shells 8 and 10 and also has a corresponding profiling 13. This covering sheet metal member 19 is made from the same material as the upper shells 8 and 10 of the sections 5 and 6, i.e., preferably also from non-corrosive high-grade steel which is brushed in the vehicle longitudinal direction on its outer surface. The covering sheet metal member 19 and the upper sheet metal member 16 of the roll-over girder 4 extend at least so far in the vehicle longitudinal direction that the two sections 5 and 6, when telescoped one within the other, can be completely displaced into the hollow space formed by these two parts.

Figure 6:
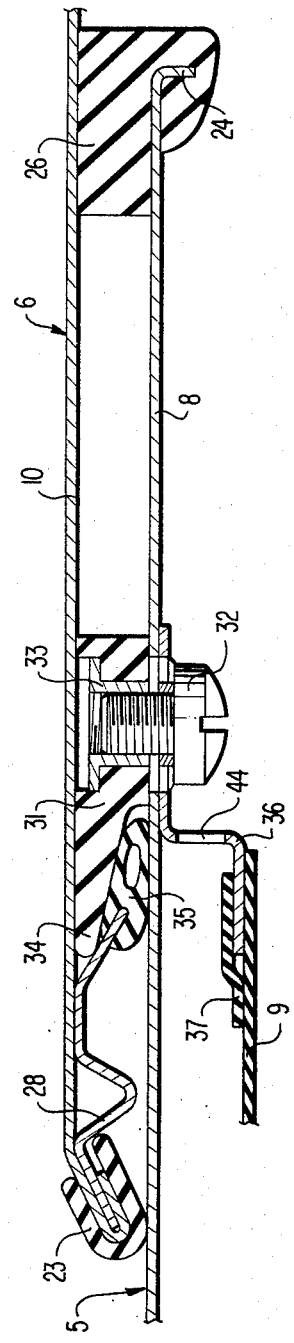
FIG. 6 is a cross-sectional view, on an enlarged scale, and illustrating certain details of the part illustrated in FIG. 3.
Figure 3:
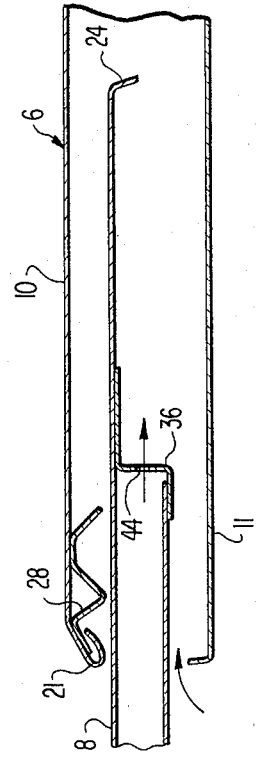
FIG. 3 is a schematic longitudinal cross-sectional view through the roof in accordance with the present invention, taken within the area of the forward end of the rear section and of the rear end of the forward section of the roof in accordance with the present invention.
Figure 4:
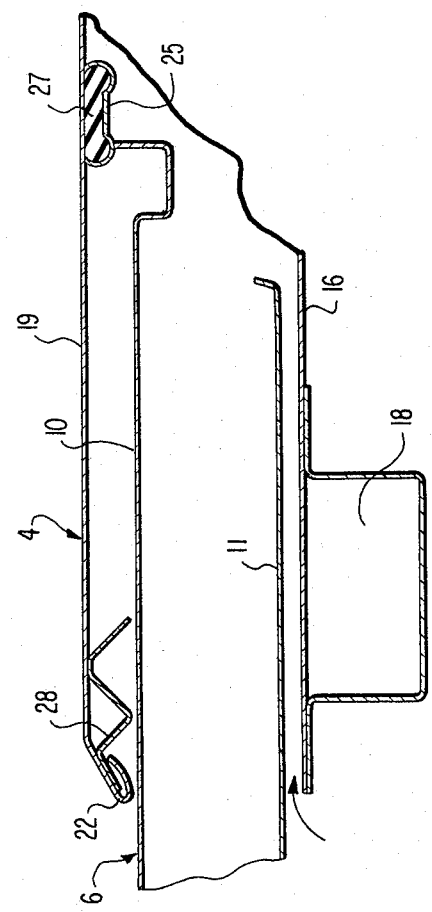
FIG. 4 is a schematic longitudinal cross-sectional view through the roof in accordance with the present invention, taken within the rear area of the rear section of the displaceable roof in accordance with the present invention.

The forward edges 21 (FIG. 3) and 22 (FIG. 4) of the covering sheet metal member 19 and of the upper shell 10 of the section 6 are slightly angularly bent off toward the inside and are provided with a sliding profile 23 which can be seen from FIG. 6 and rests on the outer surface of the upper shell 8 of the section 5 and on the upper shell 10 of the section 6 (FIG. 4). A further slide guide means is provided between the rear edges 24 (FIGS. 3 and 6) and 25 (FIG. 4) of the two shells 8 and 10 and the surfaces disposed thereabove of the shell 10 and of the covering sheet metal member 19 in that the rear edges 24 and 25 are equipped with slide members 26 (FIG. 6) and 27 (FIG. 4) of conventional synthetic resinous material. The slide members 26 and 27 are adhesively secured or bonded at the edges of the shells 8 and 10. The forward edges 21 and 22 of the shell 10 and of the covering sheet metal member 19 are reinforced each by means of a transversely metal member 19 are reinforced each by means of a transversely extending profile 28 (FIGS. 3 and 4) W-shaped in cross section, whereby the edges 21 and 22 are flanged around the forward edge of the profile 28. The rear edge of the shell 10 (FIG. 4) is reinforced by a U-shaped transversely extending profiling. The rear edge 24 of the shell 8 is angularly bent off for purposes of reinforcement.

Figure 2:
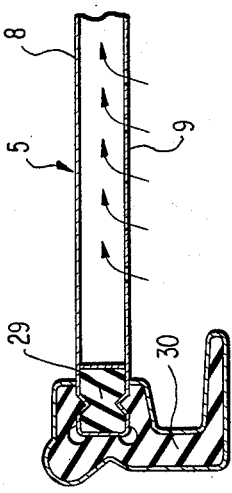
FIG. 2 is a partial longitudinal cross-sectional view, on an enlarged scale, in the vehicle longitudinal direction through the forward end of the forward section of the roof in accordance with the present invention.
Figure 5:
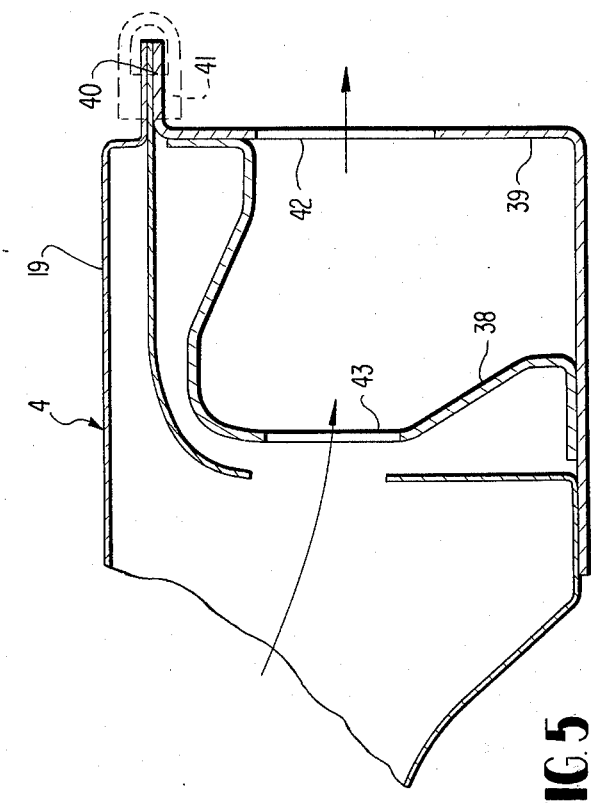
FIG. 5 is a somewhat schematic longitudinal cross-sectional view through the rear area of the roll-over girder of the roof in accordance with the present invention.

The forward edge of the section 5 is closed off by a synthetic plastic profile member 29 (FIG. 2) which is inserted between the profiled edges of the shells 8 and 9. A further synthetic plastic profile member 30 is clamped by means of conventional clips, clamps or the like on this edge from the outside, which in a manner not illustrated in detail cooperates with the locking and latching mechanism and also assists a sealing with respect to the frame 2 of the windshield 1.

Figure 7:
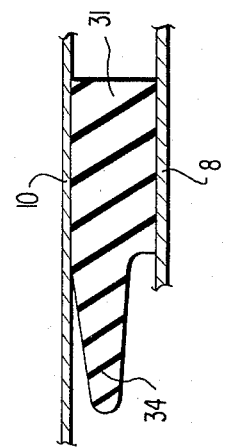
FIG. 7 is a partial longitudinal cross-sectional view similar to FIG. 6, and illustrating certain details of FIG. 6 in the non-stressed condition.

In order to prevent a rattling or the like, the sections 5 and 6 are kept under a prestress with respect to one another and with respect to the covering sheet metal member 19 of the roll-over girder 4 in the closed position. For that purpose, transversely extending wedge-shaped profile members 31 (FIGS. 6 and 7) are arranged within the area of the rear edges of the shells 8 and 10, which cooperate with the W-shaped profiles 28. The arrangement and effect of such a wedge-shaped profile 31 is illustrated in FIGS. 6 and 7 within the area of the connection between the forward section 5 and the rear section 6. The wedge-shaped profile 31 is secured by means of screws 32 at the upper shell 8 of the section 5 whereby the screws 32 are screwed into threaded bushes 33 which are inserted into the wedge-shaped profile 31. The wedge-shaped profile 31 which is made from an elastic synthetic resinous material of conventional type includes a forwardly projecting nose portion 34 which during the closing of the roof slides over the rear leg of the W-shaped profile member 28 and is deflected upwardly. The magnitude of the desired prestress is adjusted during the roof assembly. For that purpose, the sections 5 and 6 are stopped during the assembly in a position which corresponds to the not yet quite completely closed position. In this position, the wedge-shaped profile members 31 are pushed as far as possible with their nose portions 34 on the rear legs of the W-shaped profile members 28. This displacement is permitted by elongated apertures in the upper shell 8. Only then the wedge-shaped profile members 31 are fixed by tightening the screws 32 and possibly by an additional bonding or gluing. For the final closing, a force has to be applied by the locking or latching mechanism which elastically deforms the wedge-shaped profile members 31 and effects the desired prestress. A sealing profile 35 (FIG. 6) is mounted on the rear leg of the W-shaped profile 28 which includes an elastically deformable hose-like portion that is compressed during the closing by the wedge-shaped profile member 31. This portion is illustrated in the compressed position in FIG. 6.

The screws 32 further serve for the additional retention of an angle profile 36 mounted to the shell 8 from below, which is bonded or adhesively secured to the shell 8. This angle profile 36 serves for receiving the rear edge of the inner shell 9 of the forward section 5. In the embodiment illustrated in FIG. 6, the rear end of the inner shell 9 is provided on the inside with side strips 37 or the like which together with the edge form plug-in slots into which engages the angle profile 36.

In all connections and fastening means of the shells 8, 9, 10 and 11 of the sections 5 and 6 and for the mounting of the covering sheet metal member 9, welded seams or spot-welded connections are dispensed with since these might be visible from the outside, on the one hand, and might cause welding stresses, on the other, which might be the cause of deformations.

The roll-over girder 4 includes in its rear area a hollow profile extending transversely to the vehicle longitudinal direction which is formed of two thick-walled members 38 and 39, for example, of relatively thick-walled sheet metal or steel plates. The upper shell 16 of the roll-over girder 4 is secured by spot-welding or the like at the hollow bearer formed by the two thick-walled members 38 and 39. The covering sheet metal member 19 is secured with its rear edge at a rearwardly point flange 40 of the sheet metal member 39. In order to avoid also in this place a welded connection, this edge is threadedly connected or clamped fast by means of clamps 41 of conventional construction. This area is also covered off by an air-guide profile (not shown) of conventional type which adjoins this area in order to obtain a good sharp separating edge for the air flow. The clamps thereby permit a flat type of construction.

The entire roof construction forms a double-walled channel or duct which extends from the area of the windshield 1 to the rear window 3. This is additionally utilized in that the roof is constructed as vent channel. The channel extends up to the roll-over girder 4 which includes air discharge apertures 42 above the rear window 3 which are disposed within an area of the vehicle, in which a vacuum is formed during the drive. The sheet metal member 38 of the roll-over girder 4 is provided with corresponding apertures or openings 43. The same is also true for the upper sheet metal member 16. In order to be able to permit the commencement of an air flow within the area of the windshield 1, the forward area of the lower shell 9 of the forward section 5 is perforated (FIG. 2) so that an air entry is made possible thereby. The angular profile 36 is provided with apertures 44 (FIGS. 3 and 6) which permit a passage of air. An air entry is also possible by way of the gap between the inner shell 9 of the section 5 and the inner shell 11 of the section 6 (FIG. 3). Similarly, also an air inlet is additionally possible within the area between the inner shell 11 of the second section 6 and the roll-over girder 4.

The upper edges of the side window 7 which normally belong to a door, are enclosed with elastic sealing profiles 45 (FIG. 8) which consist of a rubber elastic, preferably window-clear (transparent) material. The sealing profiles 45 are placed with a U-shaped portion on the preferably lowerable side windows 7 and are secured at the same. They extend with a hose-like bulge up to within the area of the profilings 14 of the upper shells 8 and 10 which sealingly abuts at these shells 8 and 10.

The inner shells 9 and 11 of the sections 5 and 6 are coated with a hygroscopic and/or absorbent (spongy) material M in order to be able to catch and evaporate any water which enters. Leakage-or condensation-water within the outer area, which occur notwithstanding the seal and insulation, is conducted away toward the outside in a groove or channel. This groove or channel discharges the water toward the rear through a water discharge in the rear column area, when the vehicle is tilted. When the vehicle is tilted forwardly, the water flows off downwardly along the side windows through gaps barely outside of the side seals or is absorbed by the lateral sealing profile and is then further conducted away. The problem of the seal between the individual sections and from the roof to the side windowpanes 7 may also be solved, for example, by pivotal sealing strips.

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

What is claimed is:

1. A roof for a motor vehicle with an area to be opened between a windshield and a roll-over girder means disposed within the area of a rear window, characterized in that the area to be opened is subdivided into at least two sections which are telescopically slidable one within the other and retractable into the area of the roll-over girder means;

the roll-over girder means comprising two laterally spaced column means, a bridging member connecting said column means, and a covering member whereby the sections are slidable externally over the column means into a hollow space formed by the roll-over girder means.

2. A roof according to claim 1, characterized in that the motor vehicle is a passenger motor vehicle.

3. A roof according to claim 1, characterized in that the covering member is a sheet metal covering member.

4. A roof according to claim 1, characterized in that said sections extend freely supported from the roll-over girder means to a frame of the windshield and substantially over the full width of the roof.

5. A roof according to claim 4, characterized in that each section consists of two shell means connected with each other at lateral edges, of which only one shell means is constructed as support and guide element.

6. A roof according to claim 5, characterized in that one shell means of each section constitutes an upper outer shell means and the other shell means of each section constitutes an inner shell means, the upper outer shell means of each section is provided within the area of each lateral edge with groove-shaped profile means extending in the vehicle longitudinal direction which serves as slide guide means.

7. A roof according to claim 6, characterized in that an upper side of the roll-over girder means is provided with profile means corresponding to the groove-shaped profile means of the lateral edges of the shell means of said sections.

8. A roof according to claim 7, characterized in that at least one of the parts consisting of shell means and upper side of the roll-over girder means are coated with a low-friction slide layer within the area of the profile means.

9. A roof according to claim 9, characterized in that both the shell means and the upper side of the roll-over girder means are provided with said slide layer.

10. A roof according to claim 8, characterized in that the groove-shaped profile means of the shell means of the sections are disposed in an area bent back inwardly toward the vehicle center.

11. A roof according to claim 10, characterized in that at least two sections constitute a forward and center section of the roof with the cover member forming a rear section, the forward, center and rear sections of the roof each having a forward and rear edge, the forward and rear edges of the center section, the rear edge of the forward section and the forward edge of the covering member are provided with slide elements abutting at the outer shell means.

12. A roof according to claim 11, characterized in that the forward edges of the outer shell means and of the covering member are reinforced on the inside by a reinforcing profile means.

13. A roof according to claim 12, characterized in that the rear edges of the upper shell means of the sections include a transversely directed profile means.

14. A roof according to claim 13, characterized in that the outer shell means of the sections and the covering member of the roll-over girder means are made of high grade steel and are brushed on their outer side in the vehicle longitudinal direction.

15. A roof according to claim 14, characterized in that the inner shell means of the sections are made of synthetic resinous material.

16. A roof according to claim 14, characterized in that surfaces of the inner shell means of said sections which face the outer shell means are covered with a material having at least one hygroscopic and absorbent characteristics.

17. A roof according to claim 16, characterized in that said material is both hygroscopic and absorbent.

18. A roof according to claim 14, characterized in that means are provided for maintaining the sections under an elastic prestress with respect to each other and with respect to the covering member of the roll-over girder means when the roof is in a closed position.

19. A roof for a motor vehicle with an area to be opened between a windshield and a roll-over girder means disposed within an area of a rear window, characterized in that the area to be opened is subdivided into at least two sections which are telescopically slidable, one within the other, and retractable into the area of the roll-over girder means, the roll-over girder means comprising two laterally spaced column means, a bridging member connecting said column means, and a covering member whereby the sections are slidable externally over the column means into a hollow space formed by the roll-over girder means said sections extend freely supported from the roll-over girder means to a frame of the windshield and substantially over the full width of the roof, each section consists of two shell means connected with each other at lateral edges, of which only one shell means is constructed as support and guide element, one shell means of each section constitutes an upper outer shell means and the other shell means of each section constitutes an inner shell means, the upper outer shell means of each section is provided within the area of each lateral edge with a groove-shaped profile means extending in the vehicle longitudinal directional which serves as slide guide means, an upper side of the roll-over girder means is provided with profile means corresponding to the groove-shaped profile means at the lateral edges of the shell means of said sections, at least one of the parts consisting of shell means and upper side of the roll-over girder means are coated with a low-friction slide layer within the area of the profile means, the groove-shaped profile means of the shell means of the sections are disposed in an area bent back inwardly toward the vehicle center, the at least two sections constitute a forward and center section of the roof with the cover member forming a rear section, the forward, center and rear sections of the roof each having a forward and rear edge, the forward and rear edges of the center section, the rear edge of the forward section and the forward edge of the covering member are provided with slide elements abutting at the outer shell means, the forward edges of the outer shell means and of the covering member are reinforced on the inside by a reinforcing profile means, the rear edges of the upper shell means of the sections include a transversely directed profile means, the outer shell means of the sections and the covering member of the roll-over grinder means are made of a high-grade steel and are brushed on their outer side in the vehicle longitudinal direction, and in that means are provided for maintaining the sections under an elastic prestress with respect to each other and with respect to the covering member of the roll-over girder means when the roof is in a closed position including a transversely extending elastically deformable wedging profile means provided on the upper side of the upper shell means of the sections within the area of the rear edges thereof, said wedging profile means including a nose portion slidable into a profile means of the upper shell means of the preceding section.

20. A roof according to claim 19, characterized in that the edges of lateral window pane means are enclosed with a rubber-elastic profile means which abuts at the edges of the sections within the area of the groove-shaped profile means of the upper shell means.

21. A roof according to claim 20, characterized in that the sections together with the covering member and the roll-over girder means form a vent channel extending in the vehicle longitudinal direction and terminating above the rear window.

22. A roof according to claim 21, characterized in that the inner shell means of the sections are made of synthetic resinous material.

23. A roof according to claim 1, characterized in that said sections extend freely supported from the roll-over girder means to a frame of the windshield and substantially over the full width of the roof.

24. A roof according to claim 1, characterized in that each section consists of two shell means connected with each other at lateral edges, of which only one shell means is constructed as support and guide element.

25. A roof according to claim 24, characterized in that one shell means of each section constitutes an upper outer shell means and the outer shell means of each section constitutes an inner shell means, the upper outer shell means of each section is provided within the area of each lateral edge with groove-shaped profile means extending in the vehicle longitudinal direction which serves as slide guide means.

26. A roof according to claim 25, characterized in that an upper side of the roll-over girder means is provided with profile means corresponding to the groove-shaped profile means of the lateral edges of the shell means of said sections.

27. A roof according to claim 25, characterized in that the groove-shaped profile means of the shell means of the sections are disposed in an area bent back inwardly toward the vehicle center.

28. A roof according to claim 24, characterized in that at least one of the parts consisting of shell means and upper side of the roll-over girder means are coated with a low-friction slide layer within the area of the profile means.

29. A roof according to claim 24, characterized in that the surfaces of the inner shell means of said sections which face the outer shell means are covered with a material having at least one of hygroscopic and absorbent characteristics.

30. A roof according to claim 25, characterized in that the edges of lateral window pane means are enclosed with a rubber-elastic profile means which abuts at the edges of the sections within the area of the grove-shaped profile means of the upper shell means.

31. A roof according to claim 1, characterized in that at least two sections constitute a forward and center section of the roof with the cover member forming a rear section, the forward, center and rear sections of the roof each having a forward and rear edge, the forward and rear edges of the center section, the rear edge of the forward section and the forward edge of the covering member are provided with slide elements abutting at the outer shell means.

32. A roof according to claim 1, characterized in that each section includes an inner and outer shell means, and in tha forward edges of the outer shell means and of the covering member are reinforced on the inside by a reinforcing profile means.

33. A roof according to claim 32, characterized in that rear edges of the upper shell means of the sections include a transversely directed profile means.

34. A roof according to claim 1, characterized in that each section includes an inner and an outer shell means, and in that the outer shell means of the sections and the covering member of the roll-over girder means are made of high grade steel and are brushed on their outer side in the vehicle longitudinal direction.

35. A roof according to claim 34, characterized in that the inner shell means of the sections are made of synthetic resinous material.

36. A roof according to claim 1, characterized in that means are provided for maitaining the sections under an elastic prestress with respect to each other and with respect to the covering member of the roll-over girder means when the roof is in a closed position.

37. A roof for a motor vehicle with an area to be opened between a windshield and a roll-over girder means disposed within the area of a rear window, characterized in that the area to be opened is subdivided into at least two sections which are telescopically slidable one within the other and retractable into the area of the roll-over girder means, each section consists of two shell means connected with each other at lateral edges, of which only one shell means is constructed as support and guide element, one shell means of each section constitutes an upper shell means, and in that transversely extending elastically deformable wedging profile means are provided on an upper side of the upper shell means of the sections within an area of rear edges thereof, said wedging profile means including a nose portion slidable into a profile means of the upper shell means of the preceding section.

38. A roof according to claim, characterized in that the sections together with the covering member and the roll-over girder means form a vent channel extending in the vehicle longitudinal direction and terminating above the rear window.

39. A roof arrangement for a vehicle having a selectively openable roof area defined between a windshield and a roll-over girder means disposed within an area of a rear window, the arrangement comprising:
at least two displaceable roof sections disposed over the openable roof area, each of said roof sections consisting of a tubular hollow body,
groove-shaped profile means extending in the vehicle longitudinal direction provided at each tubular hollow body, said groove-shaped profile means of each section having engaging sliding surfaces for telescopically slidably guiding one of said tubular hollow bodies within the other of said tubular hollow bodies, and a further groove-shaped profile means provided at said roll-over girder means engageable with a groove-shaped profile means of one of said tubular hollow bodies for telescopically guiding the at least two roof sections into an area of the roll-over girder means wherein said roll-over girder means includes an upper member secured at and extending between lateral columns of the vehicle and a cover member spaced from said upper member so as to define therebetween a hollow space, said further groove-shaped profile means provided at said roll-over girder means being arranged at said hollow space such that said roof sections are slidable externally over said upper member.

40. An arrangement according to claim 39, wherein said roof sections, said cover member and said roll-over girder means form a vent channel extending in the vehicle longitudinal direction and terminating above the rear window.

41. An arrangement according to claim 39, wherein each tubular hollow body consists of an upper shell means and a lower shell means connected thereto along longitudinal edges thereof, and wherein only one of said shell means for each section defines said groove-shaped profile means of said tubular hollow bodies.

42. An arrangement according to claim 41, wherein said one of said shell means of each section is said upper shell means.

43. An arrangement according to claim 41, wherein said groove-shaped profile means of said tubular hollow bodies are provided along each longitudinal edge of each of said tubular hollow bodies, and wherein said further groove-shaped profile means includes a pair of profile means provided in an area of lateral columns of the vehicle and extending in the vehicle longitudinal direction.

44. An arrangement according to claim 39, wherein said groove-shaped profile means and said further groove-shaped profile means function exclusively as the support and guidance of said roof sections such that said roof sections are self-supporting and extend in a cantilever-like manner between the roll-over girder means and a frame of the windshield.

45. An arrangement according to claim 39, wherein said groove-shaped profile means of said hollow tubular bodies and said further groove-shaped profile means are arranged such that a telescoping of the hollow tubular bodies one within the other and a retraction into the area of the roll-over girder means occurs along a straight path.

46. An arrangement according to claim 39, wherein edges of lateral window panes are enclosed with a rubber-elastic profile means which abuts at edges of the roof sections within an area of the groove-shaped profile means of said tubular hollow bodies.

* * * * *